United States Patent [19]

Caporiccio et al.

[11] 4,178,465

[45] Dec. 11, 1979

[54] PROCESSES FOR PREPARING PERFLUOROPOLYETHER OILS OF VERY HIGH PURITY AND LOW VOLATILITY

[75] Inventors: Gerardo Caporiccio; Costante Corti; Giorgio Belardinelli; Giuliano Carniselli, all of Milan, Italy

[73] Assignee: Montedison S.p.A., Milan, Italy

[21] Appl. No.: 844,834

[22] Filed: Oct. 25, 1977

Related U.S. Application Data

[63] Continuation-in-part of Ser. No. 708,791, Jul. 26, 1976, abandoned.

[30] Foreign Application Priority Data

Jul. 30, 1975 [IT] Italy .............................. 25907 A/75

[51] Int. Cl.² .......................................... C07C 43/30
[52] U.S. Cl. .................................. 568/601; 568/604; 252/52 A; 252/54; 252/77
[58] Field of Search .......... 260/615 A, 615 F, 615 BF

[56] References Cited

U.S. PATENT DOCUMENTS

| | | | |
|---|---|---|---|
| 3,442,942 | 5/1969 | Sianesi et al. | 260/544 F |
| 3,622,635 | 11/1971 | Gozzo et al. | 260/615 BF |
| 3,650,928 | 3/1972 | Sianesi et al. | 260/615 BF X |
| 3,665,041 | 5/1972 | Sianesi et al. | 260/544 F |
| 3,699,145 | 10/1972 | Sianesi et al. | 260/544 F |
| 3,704,214 | 11/1972 | Sianesi et al. | 204/158 R |
| 3,715,378 | 2/1973 | Sianesi et al. | 260/615 BF |
| 3,770,792 | 11/1973 | Sianesi et al. | 260/615 BF |
| 3,787,320 | 1/1974 | Erdman et al. | 260/615 BF |
| 3,847,978 | 11/1974 | Sianesi et al. | 260/615 F |
| 3,896,167 | 7/1975 | Sianesi et al. | 260/544 F |

FOREIGN PATENT DOCUMENTS

1537922 7/1908 France .............................. 260/615 BF

OTHER PUBLICATIONS

Christe, Inorg. Chem., vol. 11, No. 6 (1972), 1220–1222.
Bougon et al., C. R. Acad Sci. Paris, vol. 265, (1967), pp. 179–182.
Kikoin et al., Chem. Abs., 54, 8319i, 1960.
Bernhardt et al., Chem. Abs., 54 22061f, (1960).
Ellis et al., Chem. Abs., 52 14309 c,d (1958).

*Primary Examiner*—Howard T. Mars
*Attorney, Agent, or Firm*—Hubbell, Cohen, Stiefel & Gross

[57] ABSTRACT

Perfluoropolyether oils containing traces of $H_2O$ molecularly dissolved therein are rendered anhydrous and hyperpure by treatment with chlorine trifluoride or monofluoride at a pressure of 1–5 atm. and a temperature of 0°–50° C. after which the treated oil is selectively fractionated.

7 Claims, No Drawings

PROCESSES FOR PREPARING PERFLUOROPOLYETHER OILS OF VERY HIGH PURITY AND LOW VOLATILITY

BACKGROUND OF THE INVENTION

Field of the Invention

The present invention relates to processes for preparing mixtures of anhydrous liquid perfluoropolyethers having certain definite physical and chemical characteristics which result from both their chemical structure and from the well defined and narrow molecular weight ranges (M.W.) of the individual constituents of the mixtures, as well as from their degree of purity.

SUMMARY OF THE INVENTION

The processes according to the invention provide mixtures of perfluoropolyether oils characterized by a particular combination of characteristics, that is, a definite perfluorinated chemical structure, with a high degree of absolute purity, a narrow range of molecular weights of the individual constituents of the mixtures, extremely low volatility and minimal variation in viscosity with varying temperatures, which allow one to use the mixtures of the invention in applicational fields where a low vapor pressure associated with a homogeneous chemical structure and with definite molecular weight and a limited defined dispersion range are required and where the properties of resistance to oxidation, temperature and chemical solvents and reactants are required, properties which, for the intended uses, may be compromised by only very small percentages, i.e., by amounts of only several p.p.m. of impurities present therein.

More particularly, these properties are:

(a) A high average molecular weight varying between about 3,000 and about 20,000;

(b) a chemical structure of the perfluoropolyethers corresponding to formula (1)

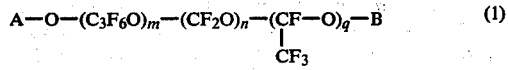

wherein $-C_3F_6O-$, $-CF_2O-$ and $-CF(CF_3)O-$ are oxyperfluoroalkylene units randomly distributed along the chain, wherein the $-C_3F_6-$ group derives from the opening of the double bond of hexafluoropropene, m is a whole number between 15 and 100, preferably between 15 and 50, n is a whole number between 1 and 80, preferably between 1 and 10, q is a whole number between 1 and 9, preferably between 1 and 5, the sum (m+n+q) is a whole number between 17 and 100, preferably between 17 and 65, the ratio n/m+q is between 0.06 and 1, and A and B are independently selected from the group consisting of $-CF_3$, $-C_2F_5$ and $-C_3F_7$, or to formula (2)

wherein $-C_2F_4O-$ and $-CF_2O-$ are oxyperfluoroalkylene units randomly distributed along the chain, p is a whole number between 30 and 300, preferably between 35 and 250, r is a number between 5 and 300, preferably between 6 and 250, the sum (p+r) is a number between 35 and 600, preferably between 41 and 500, the ratio r/p is a number between 0.15 and 1.5, and A and B are independently selected from the group consisting of $-CF_3$ and $-C_2F_5$;

(c) an absolute lack of impurities both with regard to traces of organic products outside the scope of formulae (1) and (2) as well as with regard to traces of impurities, even of the order of magnitude of parts per million (p.p.m.) of inorganic products such as water;

(d) extremely reduced vapor pressures, both at 20° C. as well as at higher temperatures (between 100° and 300° C.) with the proviso that at 220° C. the vapor pressures are less than $1 \times 10^{-8}$ torr and preferably between $5 \times 10^{-9}$ and $1 \times 10^{-13}$ torr.; that at 100° C. the vapor pressure is less than $5 \times 10^{-4}$ torr and preferably below $5 \times 10^{-5}$ torr; and that at 200° C. the vapor pressure is be less than $10^{-1}$ torr. and preferably less than $10^{-2}$ torr. More particularly, certain of the oils obtained according to the invention, i.e., those having a structure corresponding to formula (2), at 20° C. have vapor pressures equal to or less than $2 \times 10^{-12}$ torr., while at 200° C. and 300° C., respectively, they have vapor pressures of $5 \times 10^{-8}$ torr. and $5 \times 10^{-4}$ torr. These very low vapor pressures are most useful in conferring on the oils extremely low losses due to volatility even at high temperatures (e.g., losses of less than 0.2% according to ASTM-D972-56 at 149° C.);

(e) a narrow (limited) range of molecular weights such that the index of polydispersity defined by the ratio $\overline{M}w/\overline{M}n$, where $\overline{M}w$ is the average ponderal molecular weight and $\overline{M}n$ is the average number molecular weight of the mixture (P. J. Flory,- 'Polymer Chemistry" Ed. Cornell, New York, 1953, pages 273 and 292), varies between 1 and 1.3; in the case of oils having a structure corresponding to formula (1), the range of molecular weights of the individual constituents differs from each other by 500±100 units of molecular weight;

(f) reduced variations in viscosity with varying temperatures with a continuous development through a wide temperature range and defined by an inclination value ASTM (D341-39) lower than 0.7 and with lower values down to 0.20, or by a viscosity index value ASTM (D2270-64) greater than 100 and up to a value of 450.

The applicational fields in which the selected, hyperpure oils with low volatility which are obtained according to the invention, may be conveniently used with absolute reliability are:

In the vacuum field where residual pressures are required to be less than $1 \times 10^{-7}$ torr. in environments in which, under prolonged operational conditions, there is required the absence of direct or indirect contamination by the vapors of motor oil in diffusion pumps, or of lubrication or seal oils in mechanical pumps;

In the field of lubrication, where rigorous operational temperature conditions are prescribed or where the lubricated parts are exposed to environments of reduced pressure or to a chemically aggressive atmosphere, and any case where long lubricating life under stationary conditions and in the absence of contamination is required; in this respect, the oils of the invention may be used either as pure liquids or as dispersing media for obtaining lubricating greases that are particularly stable under the described operational conditions.

Typical examples of such applications are:
the use of non-volatile oils with structures corresponding to formula (1) as driving fluids for oil vapor diffusion vacuum pumps; with certain types of perfluoropolyether oils corresponding to formula (1), it is possible to attain final residual pressures below $10^{-8}$ torr, which are perfectly stable for prolonged times and without any retrodiffusion of contaminating vapor from the oil into the environment subjected to such vacuum.

This is very useful, for example, in the field of $UF_6$ enrichment by diffusion or centrifugation in the gaseous state, where hydrocarbon type motor oils cannot be used unless all contact between the $UF_6$ vapors and the oil vapors is prevented, because in such case the oils can be chemically attacked by the $UF_6$. On the contrary, by using the oils of the invention it is possible to permit contact between the $UF_6$ rich medium and the vacuum pumping unit because the present oils are immune to attack. Moreover, the perfluorinated oils of the invention are also usable as lubricating and motor fluids for vacuum diffusion pumps in the field of electron microscopy, where their resistance to exposure to accelerated elementary particles and their capacity to produce very high vacuum on the order of $10^{-7}$ torr. combines with their stability for periods of time that are even greater than one year. They are also useful in the aerospace field for the permanent lubrication of parts exposed to widely alternating low and high temperatures, and to bombardment by elementary particles, such as occurs in interplanetary space.

The perfluoropolyether oils which are used as starting materials for the oils according to the invention are synthesized by photooxidation of perfluoropropene [to obtain oils of formula (1)], and of tetrafluoroethylene [to obtain oils of formula (2)], and are then subjected to the chemical stabilization processes described respectively in U.S. Pat. Nos. 3,442,942; 3,896,167; 3,650,928; 3,699,145; 3,704,214; 3,715,378 and 3,665,041. More specifically, oils of general formula (1) are obtained by reacting perfluoropropylene in liquid phase with oxygen, at temperatues between $-80°$ C. and $+25°$ C. under U.V. radiations emitted from a source of high pressure mercury vapors. Conversely, oils having general formula (2) are obtained by reacting, at temperatures from $-80°$ C. to $+25°$ C., tetrafluoroethylene and oxygen in an inert solvent wherein the $C_2F_4$ concentration is between 0.005 and 1 mole per leter of solution and the molecular oxygen is maintained at a partial pressure between 0.3 and 2 atm. The crude products obtained from either of the two photosynthesis reactions are then stabilized by thermal treatment and subsequently transformed into inert oils by reacting them with fluorine, as described in columns 11 and 12 of U.S. Pat. No. 3,665,041.

It is clear that the particularly sophisticated applicational fields noted above require a degree of absolute purity for the compounds of formulae (1) and (2). In fact, uranium hexafluoride, would be expected to be stable when in contact with chemically resistant products such as the perfluoropolyether oils. However, when uranium hexafluoride is placed into contact with such oils contaminated even by small traces of dissolved water (e.g., such oils may contain homogeneously molecularly dissolved up to 500 p.p.m. of $H_2O$) will immediately decompose and generate solid products, such as absolute or hydrated uranyl fluoride in amounts corresponding to 16-18 times the weight of the contaminating water. Such solid products are undesirable during lubrication inasmuch as they cause seizing phenomena of the lubricating mechanisms or they decompose under heat and generate reduction products of uranium (see J. H. Simons in "Fluorine Chemistry," vol. I, Accademie Press, 1950, page 60) which are undesirable because of their contamination of the environment under consideration.

However, such oils, which are the precursors and starting materials for obtaining the fractions of the oils of the invention are not suitable for the use and specific applications mentioned above because of the inordinately large distribution range of the molecular weights of the individual constituents, even when, as a result of modifications of the operational variables of the chemical synthesis, as described in the above mentioned patents, there are obtained very high average molecular weights for the mixtures and when one would expect an absolute degree of purity with respect to the $H_2O$ content.

In fact, in mixtures of synthetic perfluoropolyether oils there are always present more or less consistent amounts of individual constituents with a low molecular weights and of traces of water, which contribute to an increase in the volatility and vapor pressure of the mixtures, with the result that such oils do not meet the rigorous standards needed for the above mentioned uses.

Even attempts to eliminate, by simple distillation, a more or less relatively consistent portion of the low molecular weight individual constituents and of the water contained in the precursor oils, do not lead to appreciable results because the mixtures themselves consist chemically of serial homologous compounds and form, from the point of view of the liquid/vapor equilibrium systems of continuous mixability with a continuous course of vapor tension. Consequently, simple distillation does not enable one to obtain distillation fractions or residues that are completely free from the constituents with a limited molecular weights and with a high vapor pressure or from inorganic impurities such as traces of water.

On the contrary, according to the invention, there may be obtained, from mixtures of oils widely polydispersed with regard to molecular weights, oil mixtures that are hyperpure with respect to water, and selected according to molecular weight molecular weights, with a polydispersion index very near to unity and with a suitable molecular weights range, and which are capable of showing the low vapor pressure values and the purity necessary for their use in the above mentioned applicational fields.

These results may be obtained by carrying out the purification i.e., the removal of water, according to the method of the invention and by fractionating the highly polydispersed mixtures at equilibrium or near-equilibrium conditions.

The purification of the perfluoropolyethers from the water resulting from atmospheric humidity, which water dissolves in the oils in a molecular manner in amounts of up to 500 p.p.m., cannot be carried out by conventional chemical procedures such as, e.g. dehydration by powerful chemical dehydrators such as calcium oxide or phosphoric anhydride or silica, because these procedures are not sufficiently effective. Thus, these procedures only reduce the water content by a small amount, actually, to not less than 200-400 p.p.m. after such treatment. In fact, if one takes a perfluoropolyether oil sample pre-treated with a standard dehydrator such as $P_2O_5$ for 48 hours under stirring, and one examines, in an alumina-glass vial, its capacity to form solid products by contact for 10 minutes with $UF_6$, it is found that considerable formation of solid products which have been identified as uranyl fluorides occurs.

It has now been found in accordance with the invention that the dehydration succeeds to completion only if the perfluoropolyether oil is reacted with particular gaseous substances capable of reacting with water, which are highly soluble in the oil and which form gaseous products composed of or combined with water. In contrast, if the perfluoropolyether oil is reacted with a solid or liquid dehydrator, such as noted above, complete dehydration does not occur inasmuch as the limited solubility between the phases hinders complete contact between the dehydrator and the traces of water that are molecularly dissolved in the oil.

Our investigations have proven that the gases commonly considered to be reactive to water, such as $COF_2$ or $COCl_2$ (phosgene fluoride or chloride) do not have the exhaustive and rapid reactive action with the water dissolved in the perfluoropolyethers, which action is necessary to meet the test of turbidity of the oil in the presence of $UF_6$, resulting from the residual content of water in the oil.

Moreover, fluorine does not possess sufficient reactivity toward the water dissolved in the perfluoropolyether oils, since, after all, as proven by the fact that such starting oils themselves come from a final treatment with fluorine in the last stage of the synthesis thereof (see Italian Pat. No. 793,154) and nonetheless still contain some water molecularly dissolved therein.

It has now surprisingly been found in accordance with the invention that chlorine fluorides, in particular $ClF$ and $ClF_3$, are capable of rapidly and completely eliminating the water molecularly dissolved in the perfluoropolyether oils by forming gaseous products ($HF$, $Cl_2$, $O_2$, $O_3$, $OF_2$). This discovery is all the more surprising since $ClF$ and $ClF_3$ are considered to be fluorination reactants and to possess general reactivity which is altogether similar to that of fluorine, especially with regard to their reactivity towards water. It is particularly preferable to use $ClF_3$ which, being an easily liquefiable and compressible gas, as contrasted with chlorine monofluoride ($ClF$), enables one to introduce it into the perfluoropolyether oil in a greater concentration and thus to achieve a rapid and complete elimination of the water dissolved therein.

The process is carried out according to the invention by placing the perfluoropolyether oil of either formula (1) or (2) into contact with $ClF_3$ fed in at pressures between 1 and 5 atm., preferably at pressures from 1.2 to 3 atm., at temperatures between 0° and 50° C., preferably between 15° and 30° C., for a period of time between 30 minutes and 5 hours, preferably between 1 and 3 hours, in a closed and moisture-protected environment, and by discharging the gaseous products by evacuating them either under vacuum or in a current of inert gases at the end of the reaction period. This treatment is always followed by fractionating the individual perfluoropolyether constituents with selection of the molecular weights in order to obtain mixtures with a molecular weights suited for the specific end uses of the oils.

Fractionating under equilibrium conditions may be carried out by fractional distillation under a controlled vacuum and by means of a rectification column provided with a number of discs exceeding 10 and operating with an R/D refluxing ratio greater than 5 (wherein R is the amount of liquid sent to the head disc of the column and D is the amount of distilled product removed from the column).

This rectification may be carried out in special columns with a low load loss in the column so that it is possible to attain pressures in the boiler that are lower than 1-2 torr and up to $10^{-2}$ torr., due to the slight hold-up of liquid in the column itself.

These conditions may be achieved by means of a distillation rectification apparatus of the Spaltrohr-Fischer HMS 300 type, which is completely automated and where, in the boilers, there may be had residual pressures of $10^{-2}$ torr, because of the spirally shaped enblock filler inside the column and where the reflux ratio R/D may be adjusted from 5 to 100. With such columns, when using a reflux ratio of from 10 to 20, one automatically obtains an excellent fractionation.

The same results may be obtained with columns having a filler body of the rotating band type or with Todd-type columns containing a helical spiral.

With columns having filling material in bulk, particularly fillers of the Protruded type (perforated hemicylinders supplied by D. E. Livingstone, New Jersey) which are characterized by a low hold-up, so as to allow the conditioning of the distillation boiler to extremely low pressures, i.e., between 1-2 torr and $10^{-2}$ torr.

It is extremely important that this reduced pressure be controlled in such a way that the exhaustion of the volatile components is carried out completely and efficiently. The pressure is maintained constant by an electronic manostat of the Monitor-Edwards 161 type. By acting on the pressure regulator, set to a certain pressure range, it is possible to gradually shift to lower equilibrium pressures as the more volatile components are gradually removed.

The various fractions of distillate are collected in groups corresponding to about 2%-5% of the total amount of oil initially subjected to rectification, and for each fraction the vapor pressure is determined by the effusiometric Knudsen method (Weissberger Rossiter, "Physical Methods of Chemistry", vol. I, part V, page 74 and following ) measuring the loss in weight by evaporation, at a residual pressure of $10^{-5}$ torr between 20° and 120° C., of a sample contained in a Du Pont 990 thermo-balance cell connected to a system capable of producing the vacuum previously mentioned and realized through a mechanical pump and an oil diffusion pump connected to each other in series (Thermochimica Acta, 9, 205, 1974; E. M. Barrall, J. A. Logan).

In this manner the distilled fractions and the samples of residual product in the boiler, drawn therefrom, can be characterized.

The molecular weights of the samples of distillates and of the distillation residues were determined by means of a vapor pressure osmometer (isopiestic method) so that, by combining the molecular weights data with the vapor pressure data, one obtains a total picture of the molecular weight/vapor tension relation of the residue on the basis of a few of the molecular/vapor pressure values of the last head-fraction correspondingly separated.

This relationship between the molecular weight and the vapor tension properties of the residue and of the last fraction of the distilled head, takes into account both the care given to the fractionation, that is, to the period of time allowed for effecting said fractionation under conditions near equilibrium, as well as to the composition of the residue as far as the width of the molecular weight range is concerned.

The determinations of the molecular weight may be carried out by measuring the kinematic viscosity and by calculating the molecular weight/viscosity ratio.

The various fractions selected and characteristized by extremely low vapor pressures and by a narrow molecular weight range, are combined so as to give selected mixtures with low volatility and an average molecular weight (molecular weight) between 3,000 and 5,000, and with a range of $500\pm100$ units of molecular weight for oil mixtures having the structure of formula (1), while the selected mixtures corresponding to formula (2) have an average M.W. value between 6,000 and 20,000, an a vapor pressure equal to or less than $5\times10^{-11}$ torr, at 20° C.

Such a large percentage of constituents of high molecular weight and of low vapor pressure may have a diluting effect on the volatile products still present in the mixture and may contribute to a lowering of the apparent vapor pressure of the mixture. However, in the applicational fields wherein the selected oils are to be used, the polydispersal characteristics of the mixture must be limited; thus, for example, in particular, in the vacuum field one cannot use an excessively polydispersed mixture as a motor fluid in dispersal pumps inasmuch as in a self-fractionating process, the vacuum would not be stable and the residual pressure would tend to drop in time, thus making control of the operational conditions difficult. Moreover, an excessive amount of high molecular weight fractions would reduce that portion of the liquid capable of boiling under the conditions of the evaporation boiler of the diffusion pump and thus would reduce the flow rate of the vapors and thus the pumping rate.

In the case where the selected oils are used as driving fluids for diffusion pumps, the average molecular weight of the vapors is another variant that influences the pumping speed in relationship to the mean molecular speed of the driving fluid, which is inversely proportional to the square root of the molecular weight (molecular weight).

The spread or width of the molecular weight range of the mixture may be limited by continuously fractionating the oil by distillation through rectification and by then collecting together those fractions with the desired molecular weight and vapor pressure characteristics. The fractionating by distillation through a rectifying column may be carried out until there are no longer attained in the boiler (wherein the residual pressure is in general, 1 torr) the limited conditions of thermal resistance of the perfluoropolyether oil (320°-350° C.). Under such conditions the maximum molecular weight of the distilled perfluoropolyether components are between about 3,000 and 4,000.

At this point the fractionating may be carried out by using a molecular distiller which, operating on thin liquid layers, allows one to attain extremely reduced pressures of up to $10^{-4}$ torr, which makes it possible to achieve a further distillation of product with a greater molecular weight (from 5,000 to 10,000).

The molecular distillation according to the invention is always carried out after the preventive elimination of the more volatile fractions by a rectification pushed to the point of equilibrium, and by passing the liquid successively in the form of a thin film on the evaporating surface whose temperature is increased at each passage by from 1° to 5° C.

The apparatus in which the molecular distillation can be carried out are of the falling film molecular distillator Schott type (of glass) or of the Leybold type in glass or steel, or of the centrifuged film C.V.C. type (Consolidated Vacuum Co., New York) which, by producing thin films of up to 0.04 mm thickness, through centrifugation, allows one to attain the maximum thermal exchange between the evaporating surface and the liquid, thus maintaining a minimum pressure drop through the evaporating film; consequently one may achieve the attainment of conditions approaching evaporation equilibrium.

Another fractionating technique, which allows one to separate fractions at equilibrium with greater molecular weights, e.g., from 10,000 to 50,000, involves the use of fractional precipitation of the perfluoropolyether mixtures from solutions in 1,1,2-trichlorotrifluoroethane or benzotrifluoride or in mixtures of perfluoro α-isopropyl-1-oxacyclohexane and perfluoro α-isobutyl-1-oxacyclopentane with organic hydrogenated liquids highly soluble or completely mixable with the fluorinated solvents, but unmixable with the perfluoropolyether oils to be fractionated and selected from the group consisting of ethylether, methylenechloride chloroform, carbon tetrachloride and pentane.

This fractionating technique is effected under conditions near to solubility equilibrium in the manner described below. In a spherical flask with a conical bottom, immersed in a thermostatically stabilized bath, and fitted with a stirrer or a reflux cooler, a solution of 2–10%, but preferably 4–5% of perfluoropolyether oil to be fractionated was prepared in anhydrous 1,1,2-trichlorotrifluoroethane. This solution is then heat stabilized thermostatically at $15°\pm0.2°$ C. and kept under stirring. Thereupon, dropwise, there was added the precipitating organic liquid until there appeared a slight, incipient opalescence floating over the surface. At this point the addition of precipitating liquid was stopped and then, after the incipient opalescence had diffused itself over the entire mass, the temperature of the bath was raised in such a way that at $30°\pm1°$ C. the mass again became completely homogeneous. Thereupon the bath was cooled at the rate of 3° C./hour and if the opalescence reappeared, the bath was thermostabilized at 15° C. under stirring; the stirring was then interrupted and the suspended liquid phase left to precipitate until complete demixing occurred at the bottom of the phase enriched with perfluorinated product. The liquid phase was then drawn off by careful siphoning. These operations were then repeated adding additional precipitant.

The individual enriched fractions which contain the perfluoropolyether components dissolved therein, starting from the highest molecular weight, are characterized by measuring molecular weight, determined by osmometry (V.P.O.) and by determining the vapor tension by the Knudsen method. There is obtained a distribution of the molecular weight of the individual fractions after which one may then combine a certain number of fractions in order to reconstitute a particular mixture with predetermined requisites of vapor pressure, molecular weight and low polydispersity index ($\overline{M}_w/\overline{M} \leq 1.3$).

This fractionating technique is particularly useful for obtaining fractions with a narrow range of high molecular weight of perfluoropolyether oils of structure (2) characterized by a vapor pressure at 20° C. of $<10^{-12}$ torr.

DESCRIPTION OF THE PREFERRED EMBODIMENTS

The following examples are given to more clearly illustrate the invention without, however, being a limitation thereof. All parts given are by weight unless otherwise indicated.

EXAMPLE 1

The starting material used in this example was a perfluoropolyether oil (commercial product Fomblin Y/25 of Montedison S.p.A.), having a structure corresponding to formula (1), and having a kinematic viscosity of 250 cs at 20° C. and an average molecular weight determined by means of a vapor pressure osmometer of 3,100. The material was a mixture consisting of homologous constituents of the series having molecular weights between 1,000 and 7,000, and characterized by an $n/m+q$ ratio of 0.1, as determined by N.M.R. (nuclear magnetic resonance) spectroscopy. It was prepared according to the teaching of example 5 of U.S. Pat. No. 3,665,041.

The water content of a sample of this oil was determined according to the technique of K. Fischer and found to be 300 p.p.m. A 1 liter sample of the oil was introduced into a 2 liter Monel autoclave fitted with a water circulation cooling jacket. The autoclave was pressurized at 1.5 atm. with $ClF_3$ gas coming from a gas bottle containing liquid gas.

This reaction vessel was then placed in a shaker unit with a reciprocating motion for 30 minutes after which the gaseous products were discharged. Thereupon the autoclave was again pressurized with $ClF_3$ and the operation was repeated. The gases were again discharged and the gaseous reaction products formed from the $ClF_3$ and water were completely removed by heating the oil in the autoclave at 50° C. under vacuum, after which the oil was heated in a current of anhydrous and hyperpure nitrogen at 50° C.

At the end of this operation there was obtained a water free oil. The term "water free" as used herein means that one is not able to determine the presence of water using either the K. Fischer test or the non-opalescence test with $UF_6$.

A sample of the thus obtained water free oil maintained in an atmosphere of hyperpure nitrogen, which was made anhydrous by passage through $LiAlH_4$, was rectified through a Spaltrohr-Fischer HMS 300 column having a number of discs corresponding in their effectiveness to theoretically 300 discs and which was automatically regulated so as to provide a reflux ratio $R/D=20$ (R being the quantity of liquid recycled to the topmost disc of the column and D being the quantity of distilled liquid extracted from the column), the column being subjected to a vacuum by a mechanical pump so as to have a residual absolute pressure of $0.1\pm0.01$ torr.

The boiler was heated and the contents were distilled. A fraction amounting to 27% of the total was distilled off at between 90° C. and 235° C. at 0.2 torr, after which a 2% fraction was distilled off between 235° and 240° C. at 0.2 torr; the latter fraction having a molecular weight of 3,050 and a vapor tension of $2\times10^{-8}$ torr at 20° C. as determined according to the Knudsen method.

The residual 71% of the product was passed through a molecular distillation glass column of the Schott type under an absolute pressure of 0.1 torr and with the evaporation surface thermostatically stabilized at $242°\pm0.5°$ C. to obtain a distillate and a residue which was subsequently passed through the evaporator at the respective temperatures of: 224° C., 246° C., 248° C., 250° C. and 252° C.

The six distilled fractions were combined, and together amounted to 35% of the starting product. The combined fractions, hereinafter referred to as "selected oil 1A" had the following characteristics:

Selected oil 1A: average molecular weight 3,300; vapor tension at 20° C. determined according to the Knudsen method was $9.2\times10^{-10}$ torr; kinematic viscosity: 255 cs at 20° C.

The final residue was passed through the evaporator maintained at 256° C., and a fraction amounting to 5% of the starting product and having a molecular weight of 3,550 and a vapor pressure of $2\times10^{-12}$ torr was obtained. Consequently the 35% fraction previously distilled and referred to as selected oil 1A was found to consist of constituents with molecular weight between 3,050 and 3,550 and had a polydispersivity index $\overline{Mw}/\overline{Mn}=1.25$.

A sample of 75 ml of selected oil 1A thus obtained and with the properties described, was loaded into the boiler of an Edwards type E02 oil vapor diffusion pump. This diffusion pump was connected in series with a mechanical Edwards ES 200 pump for producing a vacuum in the system, and was surmounted at its head end by a "dome," the function of which was to act as sealing head for the system and to house the probe of an ionization vacuum-meter of the Balzers IMG 030 type whose indicator control board was connected with a Leeds-Northrup Speedomax XL 682 A recorder.

A pre-vacuum ($10^{-2}$ torr) was created in the system by means of the mechanical pump, after which running water was introduced into the cooling coil externally surrounding the diffusion pump head, while heating of the boiler of the diffusion pump was started.

The residual pressure inside the system, recorded on the recorder tape, appeared to drop rapidly and then stabilize itself at a value of $1\times10^{-8}$ torr (final pressure, ultimate vacuum).

The variation in the final pressure, at a flow rate of 100 liters/sec. (gas:air), was around 3-4%. A 220 g sample of selected oil 1A, prepared according to the invention, was used for obtaining a special grease, thickened with a polytetrafluoroethylene telomer with a molecular weight of about 30,000, in the following way:

Into a Zeta-Werner-Pfleiderer laboratory arm mixer Model 1-S having a holding capacity of 0.5 liter and fitted with a sealing lid with vacuum tight seal and coupling through-pipe, and provided with a sleeve, there were introduced 675 g of a 7% suspension of tetrafluoroethylene telomer in 1,1,2-trichlorotrifluoroethane.

The sleeve of the mixer was then heat stabilized at 60° C. and the solvent was distilled, keeping the mass under stirring and removing the solvent through the conduit passing through the lid of the mixer. In the meantime, 220 g of selected 1A perfluoropolyether oil were added.

After the distillation of the solvent at atmospheric pressure, the mixer was put under vacuum (residual pressure 50 torr) and thermostatically heat stabilized at 60° C. The stirring was maintained while continuing the processing of the grease for 3 hours, that is, until there was no longer any loss of solvent.

The thus obtained grease showed a degree of penetration at 25° C. of 270 (mm/10) and a loss by evaporation after heating at 400° F. (204° C.) for 22 hours of 0.2% (ASTM D 972 method).

A sample of this grease subjected to a wearing test on a 4-balls Shell tester, carried out according to ASTM D 2266/64 standards (1,200 r.p.m., load 40 kg, for 2 hours), was characterized by a scratch-width equal to 0.35 mm. Repeating the measurement on a grease sample preliminarily exposed for 100 hours to an air current with a flow-rate of 9 liters/min. at a temperature of 193° C., revealed a scratch-width equal to 0.4 mm. These data constitute experimental proof of the excellent resistance to wear displayed by such a grease under severe oxidation conditions.

COMPARATIVE EXAMPLE A

The starting material of Example 1, that is, the oil with a structure corresponding to formula (1) and with an average molecular weight of 3,100, was subjected to dehydration in a glass flask in an atmosphere of nitrogen made anhydrous by stirring on calcium oxide for 48 hours, and then on $P_2O_5$, after which the oil was decanted and transferred into another flask under stirring for 48 hours, still at a temperature of 50° C. The oil was found to have a residual water content of 200 p.p.m.

The thus obtained oil was placed into a flask connected directly with a Liebig cooler. 10% of the total oil was eliminated as a head product at temperature between 70° C. and 120° C. at 0.1 torr and having an average molecular weight of 1,200. At the same pressure, but at between 120° and 290° C. a central fraction (75%) which appeared to consist of individual constituents with a molecular weight between 1,500 and 6,000 was distilled off. This fraction had a poly dispersion index greater than 3, and a kinematic viscosity of 250 cs at 20° C., a vapor pressure of $5 \times 10^{-5}$ torr at 20° C. according to the Knudsen method, and a loss through volatility, after 22 hours at 149° C., of 7%. After condensation of the volatile products they were found, by gas-chromatography on a column based on polyethylene glycol as the stationary phase, to contain water.

COMPARATIVE EXAMPLE B

The starting product of Example 1 (with an average molecular weight of 3,100) was subjected to dehydration, on calcium oxide for 48 hours, after which the product was transferred to a percolation column of silica gel activated by dehydration, at a percolation rate such as to have a solid/liquid contact time of 24 hours. Thereby, there was obtained an oil having, according to the K. Fischer test, a water content of about 200 p.p.m.

The oil was then transferred in an anhydrous nitrogen atmosphere into a 1 liter flask surmounted by a Vigreux column 30 cm high, directly connected with the Liebig cooler, but with a reflux regulator.

Distilling with free draws, at a pressure of 1–1.5 torr, there were drawn at 130°–250° C. 10% constituting a head fraction which had an average molecular weight of 1,900 and a kinematic viscosity of 55 cs at 20° C. The residue has a kinematic viscosity of 288 cs at 20° C. and a vapor pressure of $2 \times 10^{-7}$ torr showing a loss, due to volatility after 22 hours at 149° C., of 2%. The presence of water was detected in the condensed volatile product by gas-chromatography.

From the measured and above-reported molecular weight it was possible to conclude that the individual constituents of the mixture had a molecular weight between 1,900 and 7,000. The polydispersity index was found to be greater than 3.

A grease made from the perfluoropolyether oil distilled according to this comparative example and from tetrafluoroethylene telomer, in the same proportions and with the same procedures followed in Example 1, showed a loss by evaporation at 400° F. (204° C.) after 22 hours (ASTM D 972) equal to 7%.

A sample of grease subjected to a wear test on a 4-balls Shell apparatus, at 1,200 r.p.m. and under a 40 kg load for two hours (ASTM D 2266/64), was characterized by a scratch-width of 0.9 mm.

Repeating the measurements on the grease sample, preliminarily exposed for 100 hours to an air current flowing at a flow rate of 9 liters/min. at a temperature of 193° C., there was found a scratch-width of 1.5 mm.

COMPARATIVE EXAMPLE C

The residual fraction resulting from the distillation at 250° C. and at a pressure of 1 torr, as described in comparative example B, and obtained starting from the perfluoropolyether product of average molecular weight 3,100 described in Example 1 was the starting material for this Example.

That fraction, with a viscosity of 288 cs, was subjected to molecular distillation at a pressure of $10^{-3}$ torr, while maintaining the evaporator surface at 257° C. Thereby there was obtained a 71% fraction as a distillate, said fraction having a viscosity of 260 cs, a vapor pressure of $5 \times 10^{-7}$ torr and a loss, due to volatility after 22 hours at 149° C., of 2.8%. The presence of water was found in the condensed volatile products by gas-chromatography. The residue of that distillation had an average molecular weight of 4,700.

EXAMPLE 2

The starting material for this example was a perfluoropolyether oil (commercial product Fomblin Y/16 of Montedison S.p.A.), having a structure corresponding to formula (1) an average molecular weight of 2,800 and a kinematic viscosity of 175 cs at 20° C., and which was formed of individual constituents having a molecular weight between 1,800 and 3,500 and wherein the ratio $n/m \times q = 0.1$, as determined by N.M.R. It was prepared according to the teaching of U.S. Pat. No. 3,665,041.

The amount of molecularly dissolved water was determined on a sample of this oil and found to be 400 p.p.m. A 1.5 liter sample of this oil was introduced into a 2 liter autoclave of Monel steel fitted with a cooling sleeve with forced water circulation.

The autoclave was pressurized at 1.5 atm. with $ClF_3$ gas and was then subjected to oscillating stirring for 60 minutes, after which the gas was discharged and the operation repeated twice more, in each case exhausting the reaction gases. Then the autoclave was heated to 50° C., and a bubbling anhydrous current of helium gas was sent into the liquid through a drawing pipe. Thereafter, a sample of the liquid was withdrawn with a test tube of $Al_2O_3$ and no opalescence was found after contacting the sample with $UF_6$.

A sample of the thus treated oil was rectified in a Spaltrohr-Fischer HMS 300 column, as described in Example 1, the column being automatically set to ensure a reflux ratio $R/D = 20$ and subjected to a vacuum corresponding to an initial residual pressure of $0.1 \pm 0.01$ torr.

Then the boiler was heated and 50% of the liquid was distilled off by rectification and separated between 130° and 200° C.

Thereafter, a further fraction having molecular weight of 2,680 and amounting to 2% was obtained, followed by a fraction distilling between 200° and 220° C. at 0.02 torr (selected oil 1B). Finally a further 2% fraction having molecular weight of 3,250 was distilled. Thus, selected oil 1B could be considered as consisting of individual constituents with molecular weight's between 2,680 and 3,250. The degree of polydispersion thereof was of the order of $\overline{M}w/\overline{M}n=1.2$ and its average M.W. was about 3,000.

The oil (1B) had a kinematic viscosity of 190 cs at 20° C. and a vapor pressure at 20° C., determined according to Knudsen, of $1.9\times10^{-9}$ torr and a moisture content, at the limit of sensibility of the K. Fischer method of less than 1 p.p.m.

A sample of this selected oil (1B) was used for lubricating a mechanical pump, while a sample of selected oil (1A) prepared according to Example 1 was used as a motor fluid in a diffusion pump connected in series with the mechanical pump. This vacuum producing system was connected to a cylindrical Monel chamber, thermostatically stabilized at 80° C., in which, through an inlet valve, also of Monel steel, there was introduced $UF_6$ gas at a partial pressure of 100 torr. Thereupon the chamber was put into communication with the pumping system and evacuated until reaching a residual pressure of $10^{-7}$ torr. Then the Monel cylindrical chamber was cut off from the pumping system and again filled with $UF_6$ at a partial pressure of 100 torr, whereupon it was again evacuated to a residual pressure of $10^{-7}$ torr.

After 2,000 hours of operating the evacuated pumping system, connected to the $UF_6$ chamber from which evacuation of the $UF_6$ was carried on, the pumping system was disassembled in order to recover the oil used as lubricant in the mechanical pump and the oil of the selected type 1B prepared as described above.

The oil did not appear to be contaminated by any uranium containing solids, and its properties were found to be: kinematic viscosity=188 cs; vapor pressure, according to the Knudsen method=$3\times10^{-9}$ torr at 20° C.

EXAMPLE 3

The starting material for this example was a perfluoropolyether oil (Fomblin Y/45 of Montedison S.p.A.), having a structure corresponding to formula (1) an average molecular weight 3,900 and a kinematic viscosity of 410 cs at 20° C., and which was formed of individual constituents having a molecular weight between 3,500 and 8,000, and having an m/m+Q ratio of 0.06 as determined by N.M.R. It was obtained by a further distillation of Fomblin Y/25 described in Example 1. Analysis of the oil by the K. Fischer method revealed that this oil contained 200 p.p.m. of molecularly dissolved water and on contact with $UF_6$ heavy opalescence occurred.

A 5 kg sample of this oil was put into a 5 liter Monel autoclave fitted with a perforated Monel toroidal ring extending to the bottom of the autoclave. The autoclave was surrounded by a sleeve with circulating cold water. Through the perforated ring $ClF_3$ gas was fed in until the pressure in the autoclave was 1.2 atm. At this point the pressure was maintained constant by bleeding the reaction gases and by feeding through the drawing ring into the perfluoropolyether liquid additional $ClF_3$ gas, continuing in this way for 1 hour. At the end of the operation, dry helium was bubbled through the system. The oil in the autoclave was then discharged in a dry helium atmosphere and appeared to be free of water as determined by the Fischer method and then by the turbidity test with $UF_6$.

A sample of the oil was subjected to rectification through a Todd column provided with a spiral as a filler and of a height corresponding to a number of discs equivalent to about 10 theoretical discs. The column was surmounted by an automatic reflux regulator adjusted to a ratio R/D=10.

Distillation was started at a residual pressure of $0.1\pm\pm0.01$ torr and a 30% fraction was obtained by rectification at between 150° and 202° C. Then, at 205° C. a 2% fraction was gathered, this fraction having a molecular weight of 3,650 as determined by isopiestic osmometry (V.P.O.).

The distillation residue was then transferred into a centrifugal molecular Schott distillator, set to an absolute pressure of $10^{-4}$ torr, and the liquid was then made to flow over the evaporating body thermostatically stabilized at 190° C. and there was obtained a 7% fraction of distillate with a molecular weight of 3,700.

The residual oil was subsequently made to flow again over the evaporating body at a residual pressure of $10^{-4}$ torr at the temperatures of: 195°, 200°, 205°, 210°, 215°, 220°, 225°, 230°, 235°, 240°, 245° and 250° C. obtaining 12 distilled fractions which were combined to yield a mixture having an average molecular weight of 4,000 (selected oil 1C) and which corresponded to 30% of the starting product.

The residue was again passed over the evaporating body at a temperature of 255° C. thereby giving a fraction of 2% of the distillate, said fraction having a molecular weight of 4,200. The previously distilled fractions which were combined to give selected oil 1C consisted of individual constituents with a molecular weight between 3,700 and 4,200. The vapor pressure of selected oil 1C was determined according to the Knudsen method and found to be $1.5\times10^{-11}$ torr at 20° C.

A sample of the oil was introduced into an Edwards diffusion pump EO2 connected to a mechanical vacuum pump, with the cooling coil of the head being run through by running water, and being surmounted by a dome in which had been arranged the probe of an ionization vacuometer Edwards 1 G 5GM. Under operational vacuum conditions attained by the apparatus, the measuring instrument indicated a final residual pressure lower than $5\times10^{-9}$ torr.

EXAMPLE 4

The starting material for this example was a perfluoropolyether oil with a structure corresponding to formula (2) with an r/p ratio of 1:1, a kinematic viscosity of 50 cs at 20° C. an average molecular weight of 5,500 as determined by vapor tension osmometry, said oil consisting of individual constituents having a molecular weight between 2,000 and 30,000. It was prepared by irradiating for three hours, with a U.V. lamp of high pressure mercury vapors, Hanau TQ 81, at a temperature of $-10°$ C., a solution of oxygen and tetrafluoroethylene in $CF_2Cl$-$CFCl_2$ containing 0.3 mole of olefine per liter solution, the feed rate of tetrafluoroethylene being of 20 l/h and the volume ratio of $O_2:C_2F_4$ being 2:1. The crude was then subjected to a thermal treatment, to a fractionation and then to fluorination according to the teaching of example 6 to U.S. Pat. No. 3,665,041. The fraction subjected to fluorination had a distillation range from about 140° C. to about 300° C. The obtained oil, according to a K. Fischer analysis, was found to contain 500 p.p.m. of molecularly dissolved water.

A 5 kg sample of this oil, after being placed into a Monel steel autoclave fitted with a perforated Monel steel toroidal ring reaching to the bottom of the autoclave, was treated for two hours with ClF$_3$ gas, as described in Example 3. At the end of the treatment, after elimination of the gaseous products, the absence of water was ascertained by means of the UF$_6$ test.

A sample of the thus treated oil was subjected to rectification in an adiabatic glass column containing filling bodies of the "Protruded" type with a height corresponding to about the theoretical number of 10 discs, the column being surmounted by an automatic reflux regulator adjusted for an R/D ratio equal to 10.

Distillation of the sample was carried out at a residual pressure of 0.5±0.1 torr regulated by an electronic manostat, of the Monitor 161 Edwards type, whereby 8% of the starting product was gathered and then subdivided into 3 fractions which were distilled at between 180° and 200° C. The residue was then distilled in a laboratory Schott molecular distiller, under vacuum at $10^{-4}$ torr, and with the evaporating surface thermostabilized at 120° C. there was obtained a distilled fraction of 2%, while the residue was again passed over the evaporating body at successive temperatures, respectively, of 150° and 180° C., thereby obtaining in all, from the two passages, a second fraction of 6%. The new residue was then once again evaporated at successive temperatures of 210° and 240° C. thereby obtaining in all, from the two passages a third distilled fraction of 5% which has a molecular weight of 5,500 as found by isopiestic osmometry. The residue at 240° C. was then distilled by evaporating it at the surface at temperatures of 260°, 280° and 300° C., obtaining in total, 15% of product with an average M.W. of 6,200 (selected oil 2D) which was characterized by a vapor pressure of $5 \times 10^{-11}$ torr at 20° C., $5 \times 10^{-7}$ torr at 100° C., a kinematic viscosity of 60 cs at 20° C., a viscosity index of 340 (ASTM D 2270/64), a "pound point" below $-100°$ C. and by a loss by evaporation after 22 hours at 400° F. (204° C.) of 0.5% (ASTM D 972).

Using a sample of selected oil 2D, it was possible to prepare a grease thickened by means of a tetrafluoroethylene telomer using the procedures and quantities set forth in Example 1, thereby obtaining a grease endowed with a penetration degree of 280 (mm/10) and which can be used as a lubricant within the temperature range of $-80°$ C. to $+200°$ C.

Samples of selected oil 2D were used for the lubrication of gears and bearings in operation at temperatures ranging as low as $-80°$ C.

EXAMPLE 5

The starting material for this example was a perfluoropolyether oil having an average molecular weight of 6,200 and a structure corresponding to that of formula (2), which was obtained as the residue from the molecular distillation at 300° C. at a residual pressure of $10^{-4}$ torr which was obtained according to Example 4.

A 100 g sample of the oil residue from the molecular distillation at 300° C. was dissolved in 1,1,2-trichlorotrifluoroethane so as to obtain a 5% solution thereof. This solution was then placed into a 5 liter flask with a conical bottom which was thermostabilized at 15° C.±0.2° C.

To this solution 250 ml of methylene chloride were then added until incipient demixing of the phases occurred. The mixture was then heated to 35° C. until complete dissolution was achieved, after which the solution was thermostabilized at 15° C. with stirring overnight. Stirring was stopped and the mixture was left standing for 5 hours after which the heavier demixed phase was separated. From this phase, by evaporation of the solvents, there was obtained a fraction (2E) of the perfluoropolyether oil with a molecular weight of 25,000, corresponding to 5% of the starting oil of Example 4.

Proceeding in the same way, and adding to the solution, which was thermostabilized at 15° C., a further 140 ml of methylene chloride, an oil fraction with a molecular weight of 20,000, corresponding to 5% of the starting oil of Example 4 (fraction 2F) was obtained.

Proceeding further in the same way, there was obtained a further fraction (2G) with molecular weight 16,000, corresponding to 4% of the starting oil of Example 4; by the addition of further portions of 150, 200, 250 and 350 ml, respectively, of methylene chloride there were obtained four further fractions (2H, 2I, 2L, 2 M) of perfluoropolyether oil, which by mixing together, gave a product with an average molecular weight of 12,000 and a viscosity of 200 cs at 20° C. (selected oil 2 N) corresponding to 20% of the starting oil of Example 4.

A still further addition of 150 ml of methylene chloride to the remaining solution yielded another fraction (2%) of oil with a molecular weight of 10,500. Thus, it appeared that the selected oil 2 N consisted of individual constituents having a molecular weight between 16,000 and 10,500.

Selected oil (2 N) had a vapor tension at 20° C. of $8 \times 10^{-13}$ torr as determined according to the Knudsen method and "pour point" of $-60°$ C.

A sample of selected oil 2 N, obtained by repeating numerous preparations according to Example 4 and the above procedures was used for preparing a thickened grease with the telomer of tetrafluoroethylene (containing 15% of thickener), which showed a degree of penetration at 25° C. equal to 280 (mm/10), a dropping point of 185° C. (ASTM D 2265) and a loss of volatiles equal to 0.95% after 24 hours at 125° C. under a vacuum of $1 \times 10^{-6}$ torr.

By combining fractions 2F and 2G there was obtained a mixture of perfluoropolyether oils (2P) with a structure corresponding to formula (2) and with a kinematic viscosity at 20° C. of 550 cs. This mixture 2P had a vapor pressure at 20° C. of $5 \times 10^{-13}$ torr, at 200° C. of $3 \times 10^{-7}$ torr and at 300° C. a vapor pressure of $2.2 \times 10^{-4}$ torr, and had a pour point below $-30°$ C.

With this mixture (2P) it was possible to prepare a grease containing 25% of a tetrafluoroethylene telomer. This grease showed a penetration degree at 25° C. equal to 290 (mm/10) and a loss in volatile substances, after 24 hours, under a vacuum of $9 \times 10^{-7}$ torr at 125° C., of 0.2%.

A sample of this grease, submitted to a wear test in a 4-ball Shell apparatus, at 1,200 r.p.m. under a load of 40 kg for 2 hours (according to ASTM D 2266/64), was characterized by a scratch-width equal to 0.1 mm.

These characteristics did not appreciably change after a preliminary exposure of the grease to an air current of 9 liters/min. at 193° C. for 100 hours.

EXAMPLE 6

A sample of a perfluoropolyether with a structure corresponding to formula (2) and of the selected type 2 N, obtained as described in Example 5, having a kinematic viscosity of 200 cs at 20° C., an average molecular weight of 12,000 and a vapor pressure at 20° C. of $8.0\times10^{-13}$ torr, was utilized as a lubricant in a turbomolecular pump with a spindle of the type described in "Vacuum Manual" by L. Holland, W. Steckelmacher, J. Yarwood, editor: SPON London—1974, p. 342.

This turbomolecular pump was coupled to a mechanical pump lubricated by a perfluoropolyether oil with a structure corresponding to formula (1), of the selected type 1B described in Example 3, and having a kinematic viscosity of 190 cs at 20° C., an average molecular weight of 3,000 and a vapor pressure at 20° C. of $1.9\times10^{-9}$ torr. The reserve oil of the turbomolecular pump was contained in an oil reservoir in which there was inserted a thermocouple. The thus coupled system was made to communicate with a cylindrical Monel steel chamber thermostabilized at a temperature of 70° C. Into this Monel chamber hydrogen was introduced at atmospheric pressure, after which the feed was cut off and the system, under vacuum, was made to operate. After 24 hours of operation the pressure was measured and found to be $2\pm1\times10^{-9}$ torr.

Into the Monel chamber there was then introduced a mixture of hydrogen and gaseous $UF_6$ in a volumetric ratio of 3:1 at a partial pressure of $1.0\times10^{-1}$ torr. The vacuum system was again started, while inside the Monel steel chamber a constant pressure of $1.0\times10^{-1}$ torr of the mixture of gases was maintained. After 6 days running under the described conditions during which it turned out that the temperature of the perfluoropolyether oil type 2 N, which lubricated the bearings of the pump, remained constant at $50°\pm1°$ C., the feed of hydrogen and $UF_6$ gas to the Monel chamber was interrupted and a high vacuum was maintained in the chamber for 24 hours.

At the end of this period the initial pressure was taken and found to be $2\pm1\times10^{-9}$ torr. When the feed of hydrogen/gaseous $UF_6$ into the Monel chamber was resumed at a partial pressure of $1.0\times10^{-1}$ torr and operation was continued for a further 6 days, while sucking the gas out of the chamber under the above indicated conditions.

After this period of operation the flow of the gases was interrupted, the pressure was gradually reduced and, after 24 hours, the pressure was measured and found to be $2\pm1\times10^{-9}$ torr. No variations in the temperature of the oil in the oil reservoir could be detected. After six months of this kind of working it was ascertained that the performance of the vacuum equipment previously described was still excellent and reproduced the conditions of the first week of operation. This clearly evidences the excellent resistance of the lubricating oil that, during the course of the experiment, was in contact with the flowing gas of the pump, as well as the absence of solid slag due to possible reactions of the $UF_6$ when coming into contact with any water which might have been present in the oil.

Variations and modifications can, of course, be made without departing from the spirit and scope of the invention.

Having thus described our invention, what we desire to secure by Letters Patent and hereby claim is:

1. Process for the preparation of anhydrous selected perfluoropolyether oil fractions having an average molecular weight between 3,000 and 5,000, with a variation of $500\pm100$ units of molecular weight for each single selected fraction, and the general formula:

$$A-O-(C_3F_6O)_m-(CF_2O)_n-(CF-O)_q-B \qquad (1)$$
$$\phantom{A-O-(C_3F_6O)_m-(CF_2O)_n-(}|$$
$$\phantom{A-O-(C_3F_6O)_m-(CF_2O)_n-(}CF_3$$

wherein m is a whole number between 15 and 100, preferably between 15 and 50, n is a whole number between 1 and 80, preferably between 1 and 10, q is a whole number between 1 and 9, preferably between 1 and 5, the sum (m+n+q) is a number between 17 and 100, preferably between 17 and 65, the ratio n/m+q is a number between 0.06 and 1, $-C_3F_6O-$, $-CF_2O-$ and $$-CF-O$$
$$\phantom{-C}|$$
$$\phantom{-C}CF_3$$

are oxyperfluoroalkylene units randomly distributed along the chain and wherein A and B are independently selected from the group consisting of $-CF_3$, $-C_2F_5$ and $-C_3F_7$, or of oil fractions having an average molecular weight between 6,000 and 20,000, a vapor pressure equal to or below $5\times10^{-11}$ torr at 20° C., and the general formula (2):

$$A-O-(C_2F_4O)_p-(CF_2O)_r-B \qquad (2)$$

wherein p is a whole number between 30 and 300, preferably between 35 and 250, r is a whole number between 5 and 300, preferably between 6 and 250, the sum (p+r) is a number between 35 and 600, preferably between 41 and 500, the ratio r/p is a number between 0.15 and 1.5, $-C_2F_4O-$ and $-CF_2O$ are oxyperfluoroalkylene units randomly distributed along the chain; and A and B are independently selected from the group consisting of $-CF_3$ and $-C_2F_5$, said process comprising treating a perfluoropolyether oil of the formula (1) or (2), containing traces of water molecularly dissolved therein with chlorine trifluoride or chlorine monofluoride, at a pressure of 1 to 5 atm, at a temperature between 0° C. and 50° C., removing the excess chlorine trifluoride or chlorine monofluoride and the gases formed in the reaction, and subjecting the thus treated perfluoropolyether oil to selective fractionation under equilibrium conditions so as to obtain selected fractions corresponding to from 2% to 5% of the perfluoropolyether oil subjected to fractionation.

2. A process according to claim 1 wherein treatment with the chlorine trifluoride or chlorine monofluoride is effected at a pressure of 1.2 to 3 atm. at a temperature of 15° to 30° C.

3. A process according to claim 1 wherein the perfluoropolyether oil is treated with chlorine trifluoride.

4. A process according to claim 1 wherein the selective fractionation is effected by means of fractional distillation under a very high controlled vacuum, through a rectification column with a number of discs greater than 10 and working with a reflux ratio R/D greater than 5, wherein R is the quantity of liquid recycled to the head disc of the column, and wherein D is the quantity of distilled liquid extracted from the column, optionally followed by a distillation carried out in a dropping film or centrifuged film molecular distillator, the evaporation surface of which is heated up to progressive temperatures with increments of from 2° to 30° C. for each successive run.

5. A process according to claim 4 wherein the ratio R/D is 10–20 and the progressive temperature increments are from 2° to 5° C.

6. A process according to claim 4 wherein the starting material has the general formula (2), and wherein at the end of the selective fractionation effected by distillation in a molecular distillator the residue of the molecular distillation dissolved in solvents selected from the group consisting of 1,1,2-trichlorotrifluoroethane, mixtures of perfluoro-alphaisopropyl-1-oxacyclohexane and isobutyl-1-oxacyclopentane, is subjected to fractional precipitation by adding to the solution an organic liquid selected from the group consisting of methylene chloride, chloroform and ethyl ether, in ratios with the solution whereby there occurs the precipitation of fractions comprising between 2% and 5% of the starting oil; after which the obtained fractions with the above-described equilibrium separation techniques are reunited, corresponding to 100% of the structure of formula (2) wherein the polydispersity index $\overline{M}w/\overline{M}n$, wherein $\overline{M}w$ is the average ponderal molecular weight and $\overline{M}n$ is the average numerical molecular weight of the mixtures, is between 1 and 1.3, the vapor pressure is reduced and is below $1 \times 10^{-8}$ torr at 20° C.

7. A perfluoropolyether oil fraction containing less than 1 ppm of water and prepared according to the process of claim 1.

* * * * *

UNITED STATES PATENT OFFICE
CERTIFICATE OF CORRECTION

Patent No. 4,178,465      Dated December 11, 1979

Inventor(s) Gerardo Caporiccio et al

It is certified that error appears in the above-identified patent and that said Letters Patent are hereby corrected as shown below:

Column 2, line 16: "is be" should read --is--; line 59: "and" should read --and in--.

Column 3, line 38: "in liquid" should read --in the liquid--; line 45: "leter" should read --liter--.

Column 4, line 21: "weights" should read --weight--; line 37: "weights" should read --weight--; line 44: "molecular weight molecular weights" should read --molecular weight--; line 46: "weights" should read --weight--.

Column 5, lines 60-61: "weights" should read --weight-- (in both instances).

Column 6, line 57: "weights" should read --weight--; lines 60-61: "molecular/vapor" should read --molecular weight/vapor--.

Column 7, line 10: "weight (molecular weight)" should read --weight--; line 14: "M.W." should read --molecular weight--; lines 41-42: "weight (molecular weight)" should read --weight--.

UNITED STATES PATENT OFFICE
CERTIFICATE OF CORRECTION

Patent No. 4,178,465     Dated December 11, 1979

Inventor(s) Gerardo Caporiccio et al

It is certified that error appears in the above-identified patent and that said Letters Patent are hereby corrected as shown below:

Column 10, line 2: "224°" should read --244°--.

Column 11, line 25: "at" should read --at a --; line 57: "has" should read --had--.

Column 13, line 8: "M.W." should read --molecular weight--; line 47: "m/m+Q" should read --n/m+Q--.

Column 14, line 58: "olefine" should read --olefin--.

Column 15, line 30: "has" should read --had--.; line 38: "pound" should read --pour--.

Column 18, line 7: "betwee" should read --between--.

Signed and Sealed this

Twenty-first Day of October 1980

[SEAL]

Attest:

SIDNEY A. DIAMOND

Attesting Officer         Commissioner of Patents and Trademarks